United States Patent
Banno et al.

(10) Patent No.: US 8,315,511 B2
(45) Date of Patent: Nov. 20, 2012

(54) FINGER AUTHENTICATION DEVICE

(75) Inventors: Katsuya Banno, Owariasahi (JP); Takayuki Kameyama, Owariasahi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 357 days.

(21) Appl. No.: 12/625,130

(22) Filed: Nov. 24, 2009

(65) Prior Publication Data

US 2010/0225442 A1  Sep. 9, 2010

(30) Foreign Application Priority Data

Mar. 4, 2009  (JP) ................................. 2009-050849

(51) Int. Cl.
*G03B 29/00* (2006.01)
*G06K 9/00* (2006.01)
(52) U.S. Cl. .......................................... 396/15; 382/126
(58) Field of Classification Search .................. 396/15; 382/126, 127
See application file for complete search history.

(56) References Cited

U.S. PATENT DOCUMENTS

| | | | |
|---|---|---|---|
| 6,011,860 A | 1/2000 | Fujieda et al. | |
| 7,184,576 B2* | 2/2007 | Kono et al. | 382/115 |
| 7,245,745 B2 | 7/2007 | Nagasaka et al. | |
| 2003/0002720 A1* | 1/2003 | Wada | 382/124 |
| 2003/0016345 A1* | 1/2003 | Nagasaka et al. | 356/71 |
| 2005/0047632 A1* | 3/2005 | Miura et al. | 382/124 |
| 2005/0254690 A1 | 11/2005 | Nagasaka et al. | |
| 2005/0281442 A1* | 12/2005 | Miura et al. | 382/124 |
| 2007/0058841 A1* | 3/2007 | Miura et al. | 382/115 |
| 2008/0008365 A1 | 1/2008 | Hikita et al. | |
| 2008/0063243 A1* | 3/2008 | Kiyomizu et al. | 382/115 |
| 2008/0063244 A1 | 3/2008 | Tanaka et al. | |
| 2009/0129635 A1* | 5/2009 | Abe | 382/115 |

FOREIGN PATENT DOCUMENTS

| | | |
|---|---|---|
| JP | 10-289304 | 10/1998 |
| JP | 3100993 U | 6/2004 |
| JP | 2004-265269 A | 9/2004 |
| JP | 2005-128936 A | 5/2005 |
| JP | 2005-202798 A | 7/2005 |
| JP | 2008-020942 A | 1/2008 |
| JP | 2008-071030 A | 3/2008 |

* cited by examiner

*Primary Examiner* — Rodney Fuller
(74) *Attorney, Agent, or Firm* — Foley & Lardner LLP

(57) ABSTRACT

A finger authentication device includes a base and an upper case which inclines to a proximal end side with respect to the base, which are integrally formed. The base includes a finger guide on which a finger is set, an optical system for guiding transmissive light penetrating the finger, and an image pickup unit for picking up a pattern of the light guided by the optical system. Three LEDs each for irradiating the light to the finger set on the finger guide are arranged in the upper case. The light from the LEDs irradiates a center tip and both sides of the finger, respectively.

15 Claims, 3 Drawing Sheets

FINGER AUTHENTICATION DEVICE

BACKGROUND OF THE INVENTION

The present application claims priority from Japanese application serial No. 2009-50849, filed on Mar. 4, 2009, the content of which is hereby incorporated by reference into this application.

FIELD OF THE INVENTION

The present invention relates to a finger authentication device, and more particularly, to a finger vein authentication device for personal authentication based on a finger vein.

DESCRIPTION OF THE RELATED ART

The finger vein authentication device irradiates near-infrared light from a light source to a to-be-authenticated finger set on a finger guide, and allows an image pick-up unit such as an image sensor to pick up an image of the vascular pattern of the finger derived from reflection or transmission of the light to obtain an image pattern. The obtained image pattern is then collated with the preliminarily registered pattern for personal authentication.

In the finger vein authentication device of transmission type as disclosed in Japanese Published Unexamined Patent Application No. 2004-265269, the light sources are disposed to the left and right of the guide groove on which the finger is set for generating the near-infrared light rays. The upper cover disposed above the light sources serves to diffuse the light in the direction other than the desired irradiation direction while suppressing the influence of the ambient light reflecting from the finger and the palm except the to-be-authenticated finger to the image pickup unit (see FIGS. 1 and 13 of Japanese Published Unexamined Patent Application No. 2004-265269).

Japanese Published Unexamined Patent Application No. 2004-265269 introduces several examples with respect to the light source arrangement, and also introduces related art having the light sources disposed above the finger at both sides in the oblique direction so as to irradiate the center portion on which the finger is set (see FIG. 12). Compared with the structure having the light source arranged just above the finger so as to be irradiated in the perpendicular direction (FIG. 11), the disclosed structure has no element to visually shield the finger from the user's eyes during operation, thus alleviating the feeling of pressure. FIG. 15 of Japanese Published Unexamined Patent Application No. 2004-265269 illustrates the structure for irradiating the finger from the light source arranged at the side of the finger in the irradiation direction changed by the mirror.

The use of the generally employed finger vein authentication device requires the image pick-up area to be larger than the to-be-authenticated finger for obtaining sufficient biological information with respect to the finger. However, the excessively large image pick-up area is likely to be susceptible to the ambient light, and accordingly, it is unfavorable in view of the resolution and performance of the image pick-up pattern derived from the vascular pattern. Since the finger vein authentication device disclosed in Japanese Published Unexamined Patent Application No. 2004-265269 uses many LEDs as the light sources (see FIG. 1), it leads to a cost increase. Referring to FIG. 1, the structure having the light sources arranged at left and right sides of the finger for irradiation is capable of illuminating both sides of the finger to provide good vascular pattern for identification. However, the vascular pattern derived from the tip of the finger is likely to be dark. This may cause the difference in the resolution of the pattern between left/right sides and the tip of the finger, thus causing the risk of affecting the authentication performance.

As the finger biological authentication device has been employed for the customer identification at the service window of a bank and transactions by ATMs (Automatic Teller Machines), or the personal identification for activating PCs (personal computers) in the workplace of a company, the compact and easy-to-use desktop finger authentication device has been demanded.

SUMMARY OF THE INVENTION

The present invention provides a finger authentication device intended to reduce the size and cost compared with the generally employed device.

The present invention preferably provides a finger authentication device for authenticating using biological information with respect to a finger of a user, including a base, and an upper case which inclines from a distal end side to a proximal end side with respect to the base, and is integrally formed with the base. The base includes a finger guide on which the finger is set, an optical system for guiding transmissive light irradiated to penetrate the finger, and an image pick-up unit for picking up an image of a pattern of the light guided by the optical system. The upper case includes light sources for irradiating a center tip and both sides of the finger set on the finger guide.

In a preferable example, a base portion of the upper case is integrally formed with a leading end of the base through resin molding.

In another preferable example, an angle defined by an inner surface of the upper case and an upper surface of the base is in a range from 50 to 65°, and an inner portion defined by the angle has sufficient space to accommodate the finger of the user.

In another preferable example, the finger guide has a structure inclined to have a height lowered from the proximal end side to the distal end side.

In a preferable example, the base includes a prism as the optical system for guiding the transmissive light penetrating the finger, an image sensor as the image pick-up unit disposed at one end of the prism, an AD converter for AD converting an image signal detected by the image sensor, and an amplifier for amplifying an output signal of the AD converter.

Preferably, in the example, the base includes a main substrate having the AD converter and the amplifier installed therein, and the main substrate is connected to an external device via a USB cable.

In another preferable example, the distal end at which the base is integrated with the upper case has space for accommodating a fake fingernail.

In another preferable example, a wall with a height to block incidence of ambient light, and a slope portion which is inclined from the wall along an inner portion for stabilizing the finger to be set are disposed at both sides of the finger guide, and a filter for limiting an image pick-up area is provided on a bottom of the finger guide.

Preferably, at least three LEDs as the light sources are arranged in the upper case to form a V-like shape including a first LED disposed at a center of the V-like shape for irradiating a tip of the finger, and second and third LEDs disposed upward of the first LED at both sides thereof for irradiating left and right sides of the finger, respectively.

Preferably, the upper case is provided with a secondary substrate which is electrically coupled with the main substrate, and includes a DA converter for DA converting a signal from the main substrate, an amplifier for amplifying a signal output from the DA converter, and a driver for driving the light source using the signal output from the amplifier.

The present invention is capable of providing the finger vein authentication device intended to further reduce the size and the cost, while being insusceptible to the ambient light.

DESCRIPTION OF PREFERRED EMBODIMENT

Figure 1:
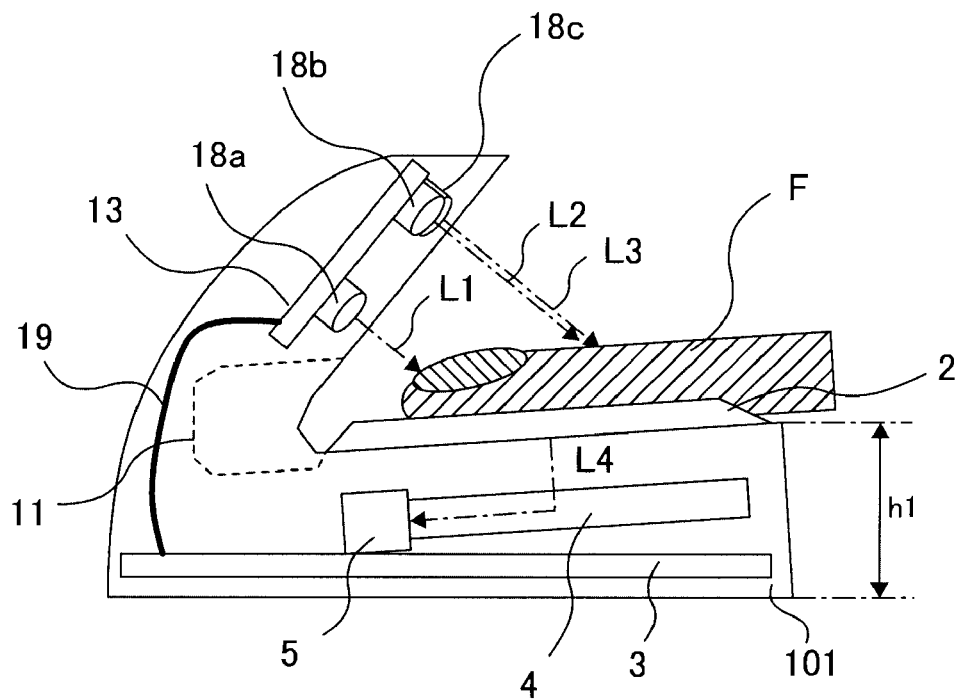
FIG. 1 is a side view illustrating a structure of a finger vein authentication device according to an embodiment.

An embodiment will be described referring to the drawings.

Figure 2:
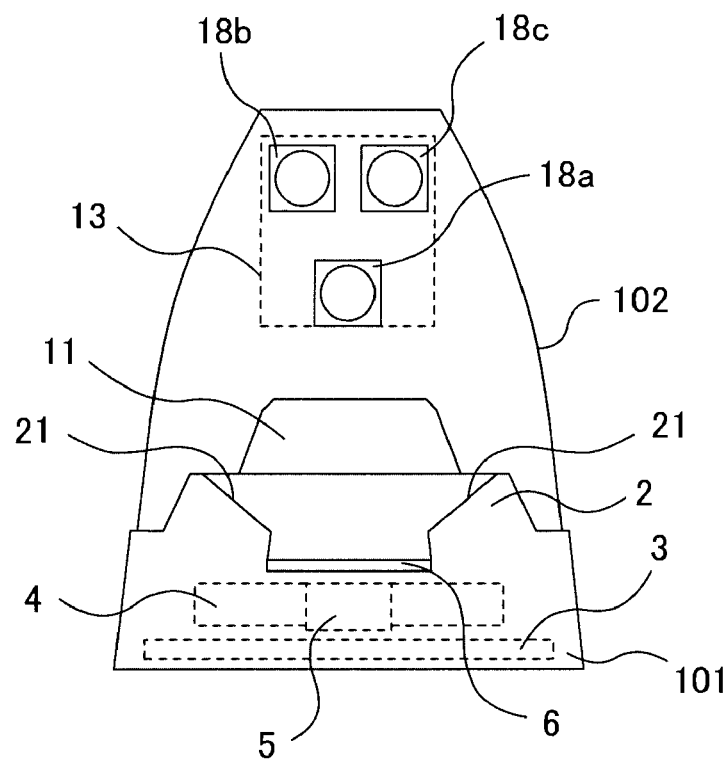
FIG. 2 is a front view illustrating the structure of the finger vein authentication device according to the embodiment.
Figure 6:
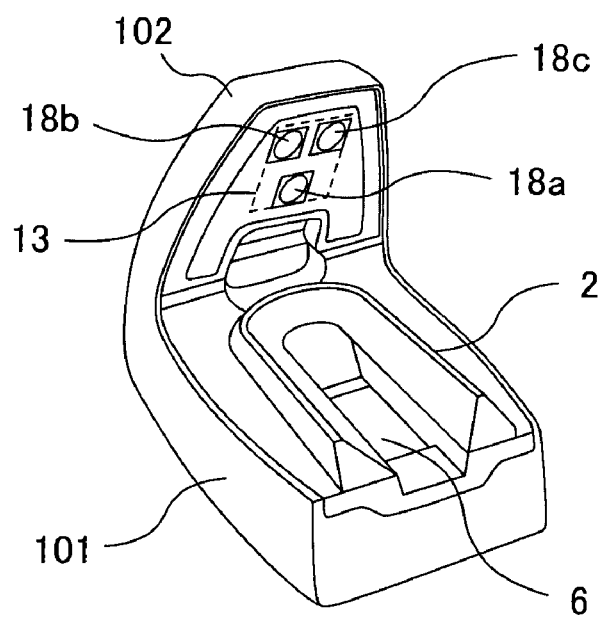
FIG. 6 illustrates an outer appearance of the finger vein authentication device according to the embodiment.

FIG. 1 is a side view illustrating a finger vein authentication device according to an embodiment, and FIG. 2 is a front view thereof. FIG. 6 illustrates an outer appearance of the finger vein authentication device (test model photo). Referring to the drawings, the finger authentication device is mainly formed of a base 101 and an upper case 102, which are integrally formed through resin molding. Preferably, an angle defined by the inner surface of the upper case 102 and the upper surface of the base 101 is in the range from 50 to 65°, and more preferably from 55 to 60° so as to form sufficient space to accommodate the user's finger. The space is opened from the distal end side to the proximal end side of the device so as to allow the user to confirm the finger position. This makes it possible to alleviate the feeling of pressure when setting the finger on a finger guide 2.

The base 101 includes such components as the finger guide 2 on which a finger F is set, a prism 4 for guiding the transmissive light penetrating the finger (that is, optical signal which contains a vascular pattern) in a lateral direction (light path L4), a camera (image pick-up unit) 5 attached to one end of the prism 4, for example, an image sensor for detecting the light L4 transmitting through the prism 4, and a main substrate 3 having an electronic circuit for processing the image signal of the finger picked up by the camera 5. A nail rest 11 is formed at the most distal end of the base 101 for accommodating a fake fingernail of the set finger.

Figure 4:
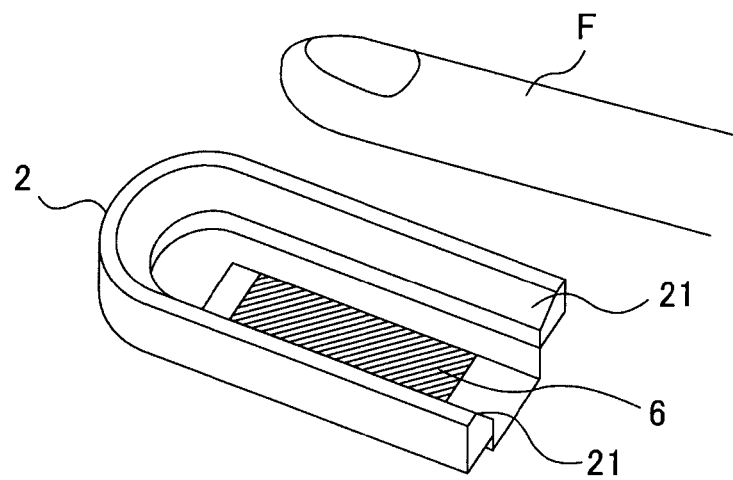
FIG. 4 illustrates an outer appearance of a finger guide of the finger vein authentication device according to the embodiment.

Referring to FIG. 4, the wall at both sides of the finger guide 2 has a height sufficient to prevent lateral incidence of the ambient light into the camera 5. A slope portion 21 is also formed at both sides of the finger guide 2 to prevent lateral movement of the finger. A visible light filter like an acrylic board is provided on the bottom of the finger guide 2 for limiting an image pick-up area 6.

In the embodiment, the base 101 is designed to have its height at the proximal end side, that is, h1 higher than the height at the distal end side such that the finger guide 2 of the base 101 has its height reduced from the proximal end side to the distal end side. Generally, when the finger is set on the finger guide 2, the finger at the proximal end side is positioned high because of thickness of the palm or back of the user's hand. In consideration of the aforementioned situation, the base is structured to be inclined to lower the height toward the distal end so as to bring the base of the finger into contact with the finger guide 2 without leaving the space therebetween.

The electronic circuit installed in the main substrate 3 includes an AD converter for AD (analog/digital) converting the image signal detected by the camera 5, an amplifier for amplifying an output signal of the AD converter, an interface control circuit and the like, which are not shown. The main substrate 3 is connected to a USB cable via a connector (not shown) so as to be connected to an external device such as a PC (personal computer). The main substrate 3 may be designed to install a memory for preliminarily registering vascular patterns of the finger to be collated, and an electronic element such as a microprocessor for collating a vascular pattern derived from the amplifier with the one preliminarily registered in the memory.

The upper case 102 includes three LEDs 18a to 18c each of which generates the infrared light as the light source and a secondary substrate 13. Those three LEDs 18a to 18c are arranged to form a V-like shape. The LED 18a at the center position irradiates the tip of the finger, and the LEDs 18b and 18c positioned upward of the LED 18a at both sides irradiate left and right sides of the finger, respectively. The secondary substrate 13 is electrically coupled with the main substrate 3 via an electric wire 19, and includes a DA converter for DA (digital/analog) converting the signal from the main substrate 3, an amplifier for amplifying the signal output from the DA converter, and a driver for driving the LEDs 18a to 18c in accordance with the signal output from the amplifier.

Figure 3:
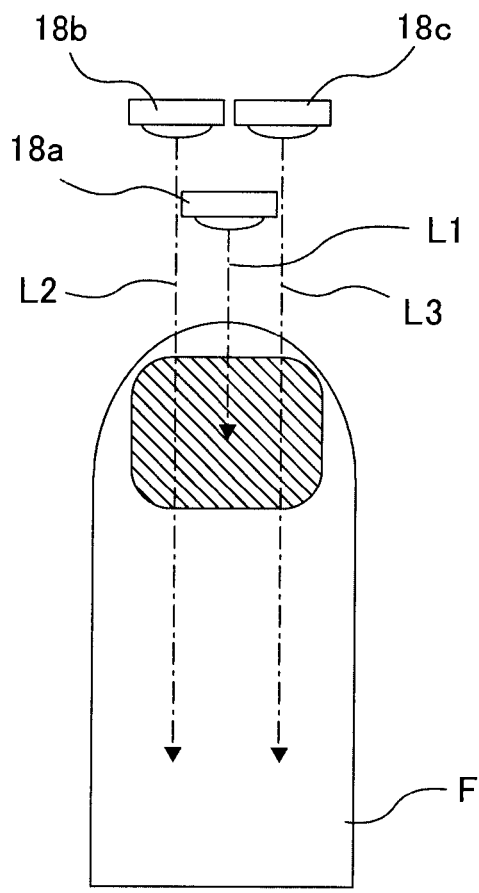
FIG. 3 is a plan view illustrating a light path from each LED of the finger vein authentication device according to the embodiment.

FIG. 3 illustrates the state where the three LEDs irradiate light rays. A light ray L1 from the LED 18a at the center irradiates a fingertip at the center of the finger which mainly includes a nail portion. Light rays Lb and Lc from the LEDs 18b and 18c located at both sides irradiate the left and right sides of the finger, respectively. The aforementioned light source arrangement allows the finger to be uniformly irradiated while preventing the fingertip of the finger F from becoming dark. This makes it possible to prevent deterioration in the resolution of the image of the finger to be picked up.

Figure 5:
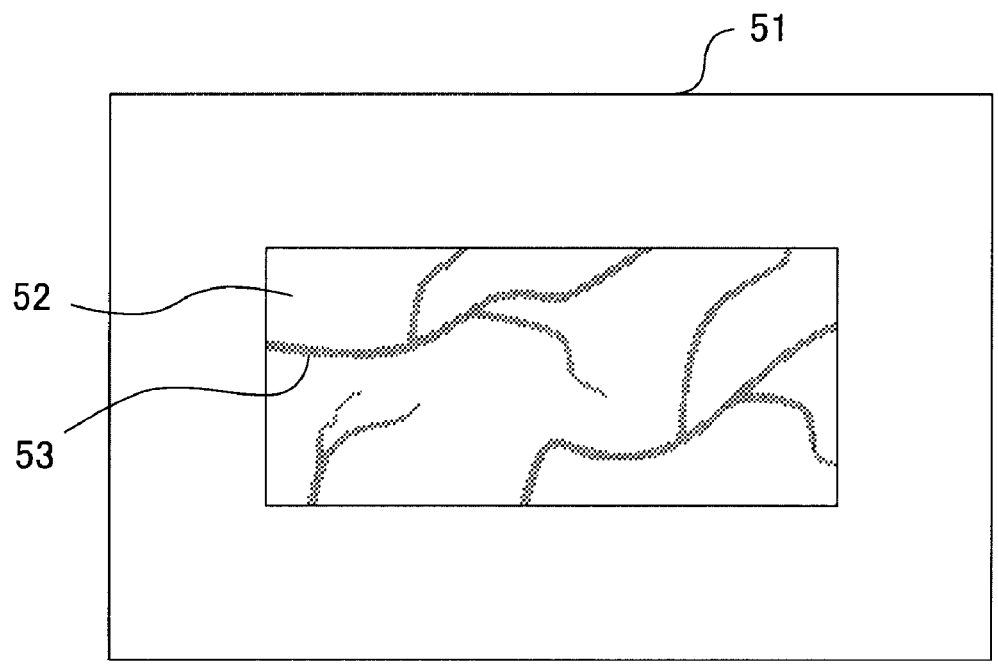
FIG. 5 illustrates an example of a pick-up image of the finger according to the embodiment.

FIG. 5 illustrates an example of a picked up image of the finger. A pick-up image 51 displays a pick-up area image 52 having the image pick-up area limited. The image 52 of the finger reflects a vascular pattern 53 as shown in the drawing because hemoglobin in the vein blocks transmission of the infrared light. Based on the vascular pattern image, the obtained vascular pattern is compared with the one preliminarily registered in the memory to determine with respect to collation therebetween, based on which the personal authentication is conducted. In the aforementioned case, the memory and the processor for registering the vascular patterns may be installed in the PC. Alternatively, they may be installed in the IC card carried with the user, or installed in the main substrate of the authentication device shown in FIG. 1.

One embodiment has been described, and it is to be clearly understood that the present invention may be modified into various formed without being limited to the embodiment. In the embodiment, the secondary substrate 13 provided for the upper case 102 includes the DA converter for DA converting the signal from the main substrate 3, the amplifier, and the driver for driving the LEDs. Alternatively, the secondary substrate may have only plural LEDs and the driver installed therein while having the rest of the components of the circuit such as the DA converter and the amplifier installed in the main substrate 3.

In the above embodiment, three LEDs 18a to 18c are arranged to irradiate the finger substantially uniformly. As a modified example, four or more LEDs may be provided for the upper case 102 instead of three LEDs for irradiating the finger with light rays in a wider range if the cost restriction is overcome. In the aforementioned case, it is preferable to have the LED arrangement such that the center tip and the left/right sides of the finger are irradiated.

In the embodiment, the base 101 has the height lowered from the proximal end side to the distal end side. In the modified example, plural support legs may be attached to the bottom of the base 101 (for example, at four corners), and two of those legs at the proximal end side may be longer than the other two legs at the distal end side so as to incline the finger guide 2 of the base 101 to be lowered toward the distal end side. In another example, the finger guide 2 may be inclined to have the height lower toward the distal end side without adjusting the height of the base or the height of the support leg.

What is claimed is:

1. A finger authentication device for authenticating using biological information with respect to a finger of a user, comprising:
    a base; and
    an upper case which inclines with an angle from a distal end side to a proximal end side with respect to the base, and is integrally formed with the base,
    wherein the base includes a finger guide on which the finger is set, an optical system for guiding transmissive light irradiated to penetrate the finger, and an image pick-up unit for picking up an image of a pattern of the light guided by the optical system;
    wherein the finger guide further comprises a wall with a height to block incidence of ambient light, and a slope portion which is inclined from the wall along an inner portion for stabilizing the finger disposed at both sides of the finger guide; and
    wherein the inner portion is defined with the angle of the upper case with sufficient space to accommodate the finger of the user, and the upper case includes light sources for irradiating a center tip and both sides of the finger set on the finger guide.

2. The finger authentication device according to claim 1, wherein a base portion of the upper case is integrally formed with a leading end of the base through resin molding.

3. The finger authentication device according to claim 1, wherein the angle defined by an inner surface of the upper case and an upper surface of the base is in a range from 50 to 65°.

4. The finger authentication device according to claim 1, wherein the base has a structure inclined to have a height of the finger guide lowered from the proximal end side to the distal end side.

5. The finger authentication device according to claim 1, wherein the base includes a prism as the optical system for guiding the transmissive light penetrating the finger, an image sensor as the image pick-up unit disposed at one end of the prism, an AD converter for AD converting an image signal detected by the image sensor, and an amplifier for amplifying an output signal of the AD converter.

6. The finger authentication device according to claim 5, wherein the base includes a main substrate having the AD converter and the amplifier installed therein, and the main substrate is connected to an external device via a USB cable.

7. The finger authentication device according to claim 6, wherein the upper case is provided with a secondary substrate which is electrically coupled with the main substrate, and includes a DA converter for DA converting a signal from the main substrate, an amplifier for amplifying a signal output from the DA converter, and a driver for driving the light source using the signal output from the amplifier.

8. The finger authentication device according to claim 1, wherein the distal end at which the base is integrated with the upper case has space for accommodating a fake fingernail.

9. The finger authentication device according to claim 1, further comprising
    a filter for limiting an image pick-up area is disposed on a bottom of the finger guide.

10. The finger authentication device according to claim 1, wherein at least three LEDs as the light sources are arranged in the upper case to form a V-like shape including a first LED disposed at a center of the V-like shape for irradiating a tip of the finger, and second and third LEDs disposed upward of the first LED at both sides thereof for irradiating left and right sides of the finger, respectively.

11. The finger authentication device according to claim 1, having a structure movably placed on a desk, and being connected to an external device via a USB cable.

12. The finger authentication device according to claim 1, wherein a length in the direction of a depth of the upper case is smaller than a length in the direction of a depth of the base.

13. A finger authentication device for authenticating using biological information with respect to a finger of a user comprising:
    a base; and
    an upper case inclined to a proximal end side with respect to the base and is integrally formed through resin molding, the upper case having an angle defined by an inner surface of the upper case and an upper surface of the base in a range from 50 to 65°, and an inner portion defined by the angle having sufficient space to accommodate the finger of the user;
    wherein the base has a main substrate installed therein, which includes a finger guide on which the finger is set, a prism for guiding transmissive light penetrating the finger, an image pick-up unit for picking up a pattern of the light guided through the prism, an AD converter for AD converting an image signal detected by the image pick-up unit, and an amplifier for amplifying an output signal of the AD converter;
    wherein the upper case has three LEDs arranged to form a V-like shape, including a first LED at a center of the V-like shape for irradiating a tip of the finger, and second and third LEDs disposed upward of the first LED at both sides thereof for irradiating left and right sides of the finger;
    wherein the finger guide further comprises a wall with a height to block incidence of ambient light, and a slope portion which is inclined from the wall along an inner portion for stabilizing the finger disposed at both sides of the finger guide; and
    wherein a secondary substrate is provided, which is connected to the main substrate and includes a DA converter for DA converting a signal from the main substrate, an amplifier for amplifying a signal output from the DA converter, and a driver for driving the three LEDs based on a signal output from the amplifier.

14. The finger authentication device according to claim 13, having a structure movably placed on a desk, and being connected to an external device via a USB cable.

15. The finger authentication device according to claim 13, wherein a length in the direction of a depth of the upper case is smaller than a length in the direction of a depth of the base.

* * * * *